United States Patent
Azmy

(10) Patent No.: US 10,234,937 B2
(45) Date of Patent: Mar. 19, 2019

(54) HANDSET WITH VIRTUAL REALITY GOGGLES

(71) Applicant: Panasonic Avionics Corporation, Lake Forest, CA (US)

(72) Inventor: John Azmy, Corona, CA (US)

(73) Assignee: PANASONIC AVIONICS CORPORATION, Lake Forest, CA (US)

( * ) Notice: Subject to any disclaimer, the term of this patent is extended or adjusted under 35 U.S.C. 154(b) by 0 days.

(21) Appl. No.: 15/287,996

(22) Filed: Oct. 7, 2016

(65) Prior Publication Data

US 2018/0101225 A1    Apr. 12, 2018

(51) Int. Cl.

| G06F 3/01 | (2006.01) |
|---|---|
| G06T 19/00 | (2011.01) |
| G06F 1/16 | (2006.01) |
| G06F 3/02 | (2006.01) |
| H04N 21/214 | (2011.01) |
| B64D 11/00 | (2006.01) |
| B60K 35/00 | (2006.01) |
| H04L 29/08 | (2006.01) |

(52) U.S. Cl.
CPC .............. *G06F 3/012* (2013.01); *B60K 35/00* (2013.01); *B64D 11/00* (2013.01); *B64D 11/00155* (2014.12); *G06F 1/163* (2013.01); *G06F 3/011* (2013.01); *G06F 3/016* (2013.01); *G06F 3/0219* (2013.01); *G06T 19/006* (2013.01); *H04N 21/2146* (2013.01); *H04L 67/12* (2013.01)

(58) Field of Classification Search
CPC ......... G06T 19/00; G06T 17/20; G06T 17/00; G06T 15/10; G06T 15/00
See application file for complete search history.

(56) References Cited

U.S. PATENT DOCUMENTS

| 5,583,526 A | * | 12/1996 | Socks | G06F 3/011 345/7 |
|---|---|---|---|---|
| 5,831,584 A | * | 11/1998 | Socks | G06F 3/011 345/158 |
| 8,773,330 B2 | * | 7/2014 | Edwards | G06F 3/011 345/7 |
| 9,097,890 B2 | * | 8/2015 | Miller | G02B 27/0093 |
| 9,459,692 B1 | * | 10/2016 | Li | G06F 3/012 |
| 9,669,321 B2 | * | 6/2017 | Reveley | A63G 31/02 |
| 9,759,917 B2 | * | 9/2017 | Osterhout | G02B 27/0093 |
| 2008/0111832 A1 | | 5/2008 | Emam et al. | |

(Continued)

FOREIGN PATENT DOCUMENTS

| WO | WO2016/089985 | 6/2016 | |
|---|---|---|---|
| WO | WO 2016089985 A1 | * 6/2016 | ........... B60N 2/4876 |

OTHER PUBLICATIONS

Graser, Marc, "Qantas First Airline to Office Virtual Reality Headsets to Passengers", http://variety.com/2015/digital/news/qantas-first-airline-to-offer-virtual-reality-headsets-to-passengers-1201418368/, Jan. 29, 2015.

*Primary Examiner* — Abderrahim Merouan

(74) *Attorney, Agent, or Firm* — Brian Furrer

(57) ABSTRACT

A handset for an entertainment system of a transportation vehicle having virtual reality (VR) goggles is provided. The handset is coupled to a seat using a cord and includes a first segment having options for controlling a passenger seat function and a second segment with a display screen for displaying VR content, when the handset operates as the VR goggles.

20 Claims, 12 Drawing Sheets

(56) References Cited

U.S. PATENT DOCUMENTS

| | | | |
|---|---|---|---|
| 2009/0045285 A1* | 2/2009 | Mastrolia | B64D 25/10 244/122 AG |
| 2011/0298706 A1 | 12/2011 | Mann | |
| 2013/0162639 A1* | 6/2013 | Muench | G06T 19/006 345/419 |
| 2014/0004819 A1* | 1/2014 | Brent | H04W 4/24 455/406 |
| 2014/0043212 A1* | 2/2014 | Park | G02B 27/017 345/8 |
| 2014/0337469 A1* | 11/2014 | Bang-Olsen | H04W 4/00 709/217 |
| 2015/0097861 A1* | 4/2015 | Alaniz | G06F 3/011 345/633 |
| 2015/0097863 A1* | 4/2015 | Alaniz | G06T 19/006 345/633 |
| 2015/0100179 A1* | 4/2015 | Alaniz | A63F 13/00 701/1 |
| 2015/0234189 A1* | 8/2015 | Lyons | G02B 27/0172 345/174 |
| 2015/0348322 A1* | 12/2015 | Ligameri | G02B 27/017 345/633 |
| 2016/0048027 A1* | 2/2016 | Shpigelman | G02B 27/0179 345/156 |
| 2016/0170996 A1* | 6/2016 | Frank | G06F 17/30702 707/748 |
| 2016/0300390 A1* | 10/2016 | Malafeew | A63F 13/245 |
| 2016/0329724 A1* | 11/2016 | Ibrahim | H02J 7/007 |
| 2016/0346704 A1* | 12/2016 | Wagner | A63G 7/00 |
| 2016/0378199 A1* | 12/2016 | Sizelove | B64D 11/00155 341/22 |
| 2017/0252658 A1* | 9/2017 | Reveley | A63G 31/00 |

* cited by examiner

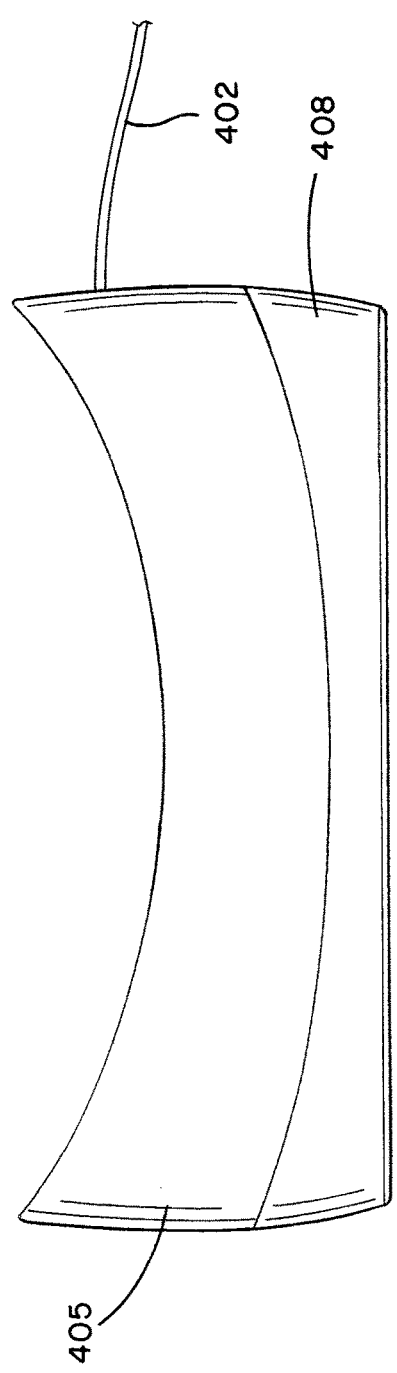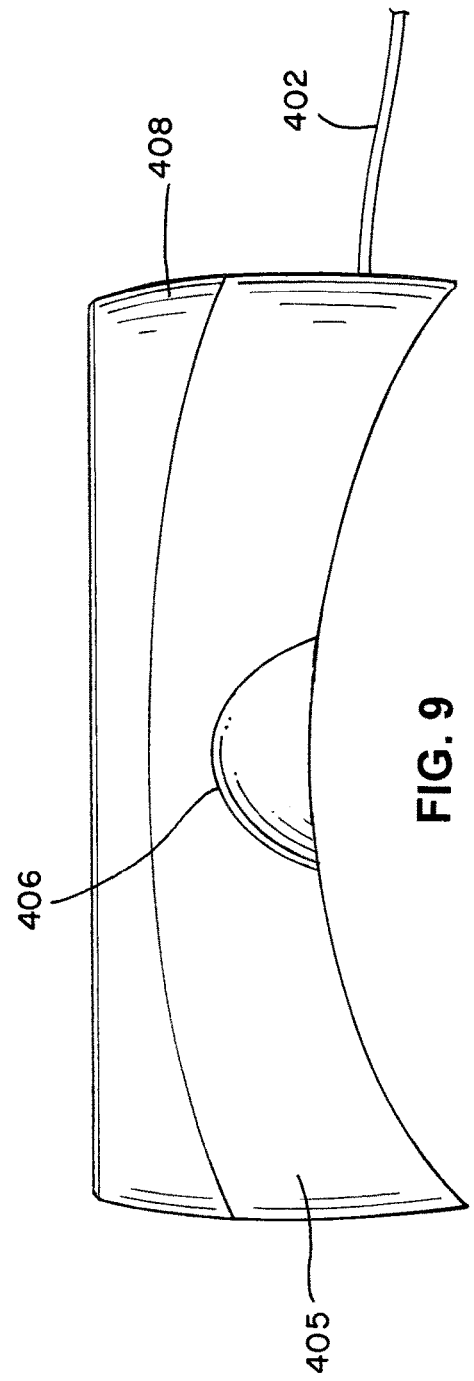

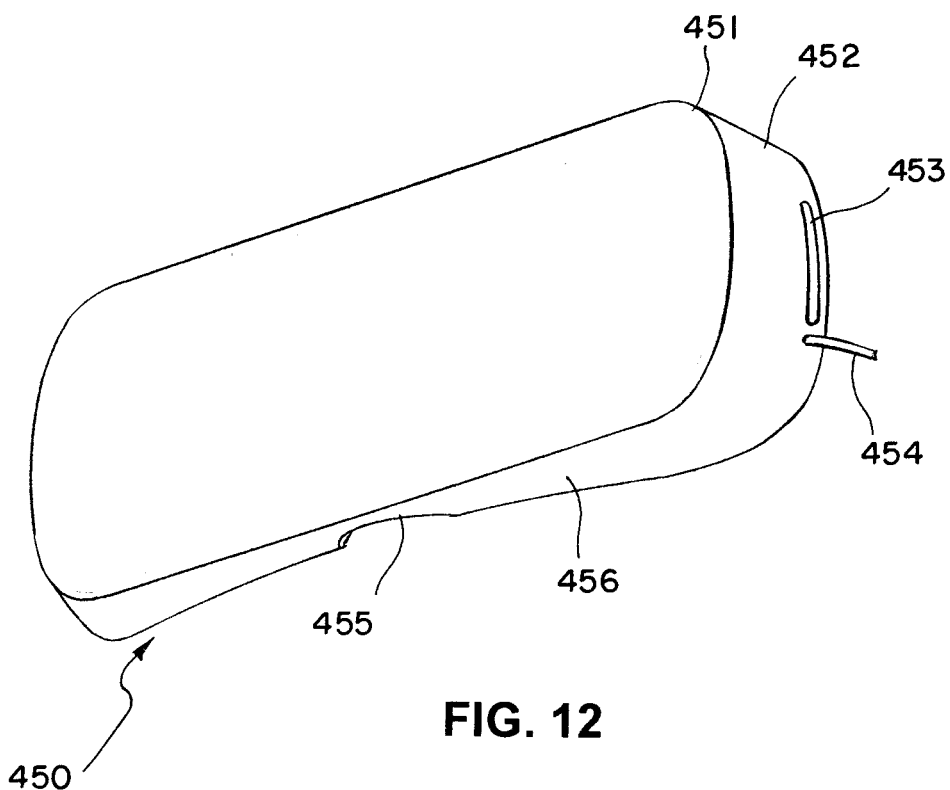
FIG. 12
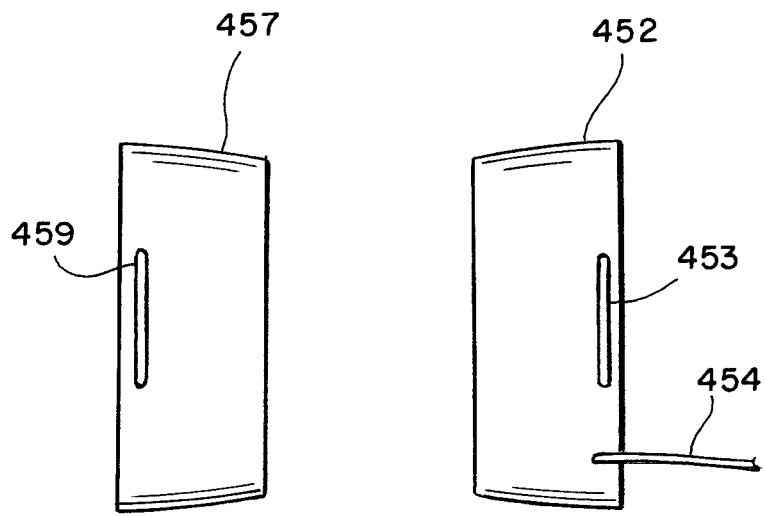
FIG. 13     FIG. 14

HANDSET WITH VIRTUAL REALITY GOGGLES

TECHNICAL FIELD

The present disclosure relates to entertainment systems for transportations vehicles in general and more particularly, to a handset with virtual reality goggles.

BACKGROUND

Transportation vehicles, for example, aircraft, trains, buses, recreation vehicle, boats and other similar vehicles use various computing devices for providing various functions, including entertainment, system control, content storage, and other functions. These computing devices include hardware (for example, servers, switches, network interface cards, storage adapters, storage devices and others) and software (for example, server applications, operating systems, firmware, management applications, application programming interface (APIs) and others).

Transportation vehicles today have individualized functional equipment dedicated to a particular passenger seat, which can be utilized by the passenger, such as adjustable seats, adjustable environmental controls, adjustable lighting, telephony systems, video and/or audio entertainment systems, crew communication systems, and the like. Many commercial airplanes today have individualized video and audio entertainment systems, often referred to as "inflight entertainment" or "IFE" systems. Such systems may also be referred to as "inflight entertainment and communication" systems as well, and typically abbreviated as "IFEC" systems.

As one example of a passenger seat function, the entertainment systems for passenger carrier vehicles, such as commercial airlines, often have video displays installed at each passenger seat. For instance, video displays may be provided at each passenger seat, such as mounted at each of the seats of the passenger seats, and/or on cabin walls and/or deployable from an armrest for seats located at a bulkhead, i.e., in the first row of a section. The video displays may also provide access to games, communication applications (e.g., telephone service, messaging, etc.), Internet browsing, and other computer applications. Sometimes such displays are referred to as smart monitors due to the ability to provide computer applications and process and store data internally.

To operate the seat functions, such as an individualized audio/video system, controls are provided on or near the passenger seat that allow the passenger to control the seat functions. The controls may be physical buttons, or on-screen interfaces displayed, for instance, on the video display of the entertainment system. For example, some commercial airplane entertainment systems have on-screen interfaces for controlling a reading light, activating a crew member call signal, as well as controlling the audio/video entertainment.

It has become quite commonplace for travelers to carry personal electronic devices having wireless communication capability, such as cellular phones, smart phones, tablet computers, laptop computers, and other portable electronic devices. This includes passengers traveling on all types of transportation including the vehicles of common carriers, such as airplanes, passenger trains, buses, cruise ships, sightseeing vehicles (e.g., ships, boats, buses, cars, etc.). Many of these personal electronic devices have the capability to execute application software programs ("apps") to perform various functions, including controlling other devices and systems.

Virtual reality typically refers to computer technologies that use software to generate realistic images, sounds and other sensations that replicate a real environment (or create an imaginary setting), and simulate a user physical presence in the environment, by enabling the user to interact with this space and any objects depicted therein using specialized display screens. VR is thus a realistic and immersive simulation of a three-dimensional environment, created using interactive software and hardware, and experienced or controlled by movement of the body or as an immersive, interactive experience generated a computer. A person using virtual reality equipment is typically able to "look around" the artificial world, move about in it and interact with features or items that are depicted within a display, for example, VR goggles.

Conventionally, VR goggles on transportation vehicles may be handed to the passengers or may be coupled to a head rest of a seat. Both options are undesirable because logistically handing out VR goggles, for example, on an aircraft for every flight can be laborious and burdensome. To use a VR goggle with a head rest of a seat may not be comfortable for a passenger depending on a passenger's height and weight because it requires the passenger to maintain a posture that may not be comfortable, especially for extended periods of time. Efforts are being made to enable a more satisfactory VR experience on transportation vehicles.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures:

FIG. 8 is a plan view of the VR handset of FIG. 5;

FIG. 9 is a front view of the VR handset of FIG. 5;

FIG. 12 is another example of a VR handset used in the system of FIG. 4, according to another aspect of the present disclosure;

FIG. 13 is a left-hand side view of the VR handset of FIG. 12;

FIG. 14 is a right-hand side view of the VR handset of FIG. 12;

DETAILED DESCRIPTION

As a preliminary note, the terms "component", "module", "system", and the like as used herein are intended to refer to a computer-related entity, either software-executing general purpose processor, hardware, firmware or a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter.

Figure 1A:
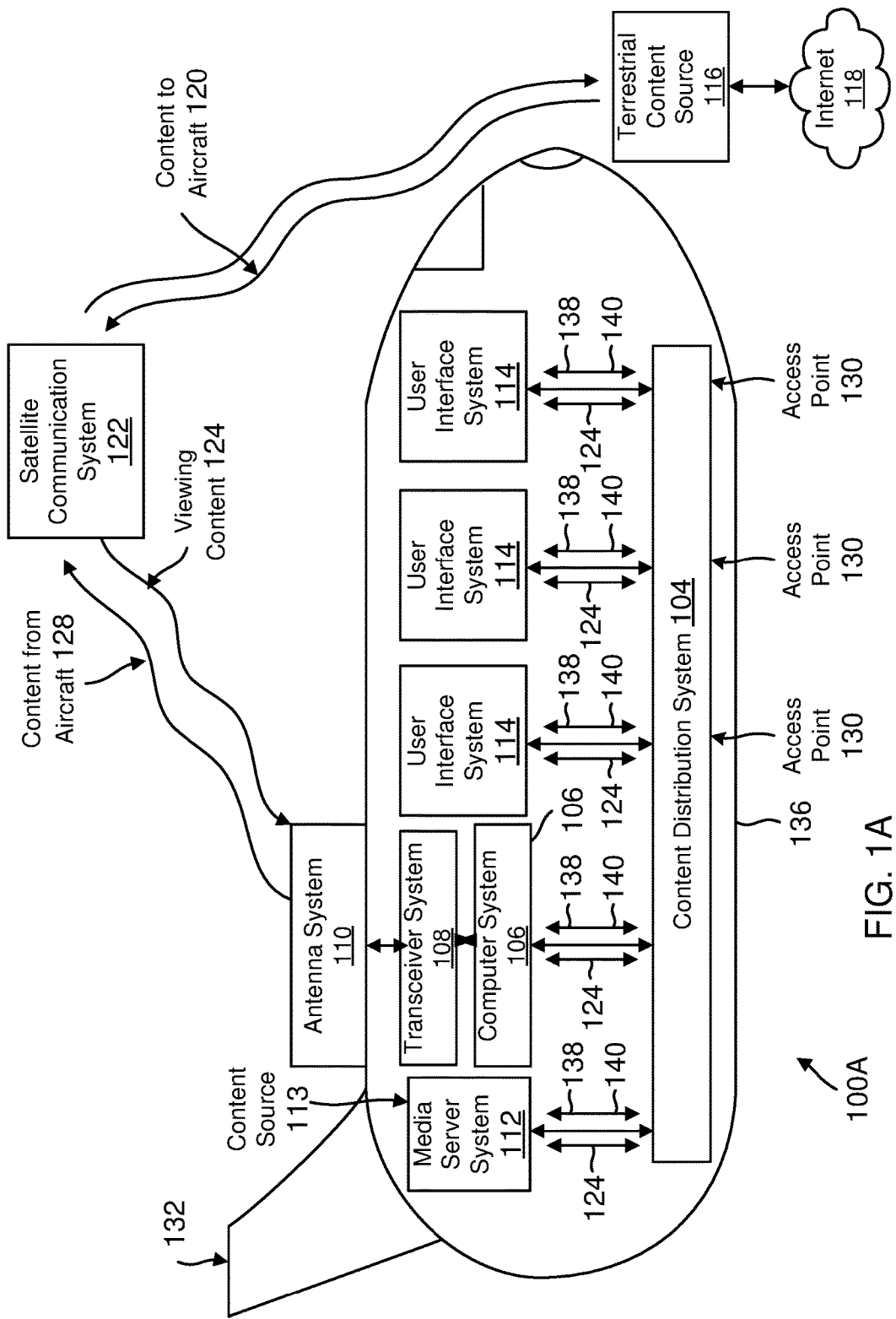
FIG. 1A shows an example of an operating environment for implementing the various aspects of the present disclosure on an aircraft.

Vehicle Information System:

FIG. 1A shows an example of a generic vehicle information system 100A (also referred to as system 100A) that can be configured for installation aboard an aircraft 132 using an adaptive virtual reality (VR) goggles integrated or combined with an IFE handset on an aircraft 132, according to one aspect of the present disclosure. When installed on an aircraft, system 100A can comprise an aircraft passenger IFE system, such as the Series 2000, 3000, eFX, eX2, eXW, and/or any other inflight entertainment system developed and provided by Panasonic Avionics Corporation (without derogation of any trademark rights of Panasonic Avionics Corporation) of Lake Forest, Calif., the assignee of this application.

System 100A comprises at least one content source 113 and one or more user (or passenger) interface systems (may also be referred to as a seat device/seatback device) 114 that communicate with a real-time content distribution system 104. The content sources 113 may include one or more internal content sources, such as a media server system 112, that are installed aboard the aircraft 132, one or more remote (or terrestrial) content sources 116 that can be external from the aircraft 132, or a distributed content system. The media server system 112 can be provided as an information system controller for providing overall system control functions for system 100A and/or for storing viewing content 124, including pre-programmed viewing content and/or content 120 downloaded to the aircraft including VR content, as desired. The viewing content 124 can include VR content, television programming content, music content, podcast content, photograph album content, audiobook content, and/or movie content without limitation. The viewing content as shown and described herein are not exhaustive and are provided herein for purposes of illustration only and not for purposes of limitation.

The server system 112 can include, and/or communicate with, one or more conventional peripheral media storage systems (not shown), including optical media devices, such as a digital video disk (DVD) system or a compact disk (CD) system, and/or magnetic media systems, such as a video cassette recorder (VCR) system, a solid state drive (SSD) system, or a hard disk drive (HDD) system, of any suitable kind, for storing the preprogrammed content and/or the downloaded viewing content 120.

The viewing content 124 can comprise any conventional type of audio and/or video viewing content, such as stored (or time-delayed) viewing content and/or live (or real-time) viewing content. As desired, the viewing content 124 can include geographical information. Alternatively, and/or additionally, to entertainment content, such as live satellite television programming and/or live satellite radio programming, the viewing content likewise can include two-way communications, such as real-time access to the Internet 118 and/or telecommunications.

Being configured to distribute and/or present the viewing content 124 provided by one or more selected content sources 113, system 100A can communicate with the content sources 113 in real time and in any conventional manner, including via wired and/or wireless communications. System 100A and the terrestrial content source 116, for example, can communicate directly and/or indirectly via an intermediate communication system, such as a satellite communication system 122. System 100A thereby can receive content 120 from a selected terrestrial content source 116 and/or transmit (upload) content 128, including navigation and other control instructions, to the terrestrial content source 116. As desired, the terrestrial content source 116 can be configured to communicate with other terrestrial content sources (not shown). The terrestrial content source 116 is shown as providing access to the Internet 118. Although shown and described as comprising the satellite communication system 122 for purposes of illustration, the communication system can comprise any conventional type of wireless communication system, such as a cellular communication system (not shown) and/or an Aircraft Ground Information System (AGIS) communication system (not shown).

To facilitate communications with the terrestrial content sources 116, system 100A may also include an antenna system 110 and a transceiver system 108 for receiving the viewing content from the remote (or terrestrial) content sources 116. The antenna system 110 preferably is disposed outside, such as an exterior surface of a fuselage 136 of the aircraft 132. The antenna system 110 can receive content 120 from the terrestrial content source 116 and provide the content 120, as processed by the transceiver system 108, to a computer system 106 of system 100A. The computer system 106 can provide the received content 120 to the media (or content) server system 112 and/or directly to one or more of the user interfaces 114 including a PED as viewing content 124, as desired. Although shown and described as being separate systems for purposes of illustration, the computer system 106 and the media server system 112 can be at least partially integrated.

The user interface system 114 may be computing terminals in communication with an access point 130. The user interface system 114 provides a display device to view content. The user interface system 114 includes a hardware interface to connect to an access point 130 that provides a wired and/or a wireless connection for the user interface system. In at least one embodiment, the user interface system 114 comprises a software application that a user downloads and installs on a personal electronic device (PED) to receive and view content via an access point 130. While bandwidth limitation issues may occur in a wired system on a vehicle, such as an aircraft 132, in general the wired portion of the vehicle information 100A system is designed with sufficient bandwidth to support all users aboard the vehicle, i.e., passengers.

The user interface system 114 can include an input system (not shown) for permitting the user (or passenger) to communicate with system 100A, such as via an exchange of control signals 138. For example, the input system can permit the user to enter one or more user instructions 140 for controlling the operation of system 100A. Illustrative user instructions 140 can include instructions for initiating communication with the content source 113, instructions for selecting viewing content 124 for presentation, and/or instructions for controlling the presentation of the selected viewing content 124. If a fee is required for accessing the viewing content 124, a Wi-Fi connection or for any other reason, payment information likewise can be entered via the input system. The input system can be provided in any conventional manner and typically includes a touch screen, one or more switches (or pushbuttons), such as a keyboard or a keypad, and/or a pointing device, such as a mouse, trackball, or stylus.

In one aspect, the user interface system 114 is provided at individual passenger seats of aircraft 132. The user interface system 114 can be adapted to different aircrafts and seating arrangements and the adaptive aspects described herein are not limited to any specific seat arrangements or user interface types.

Figure 1B:
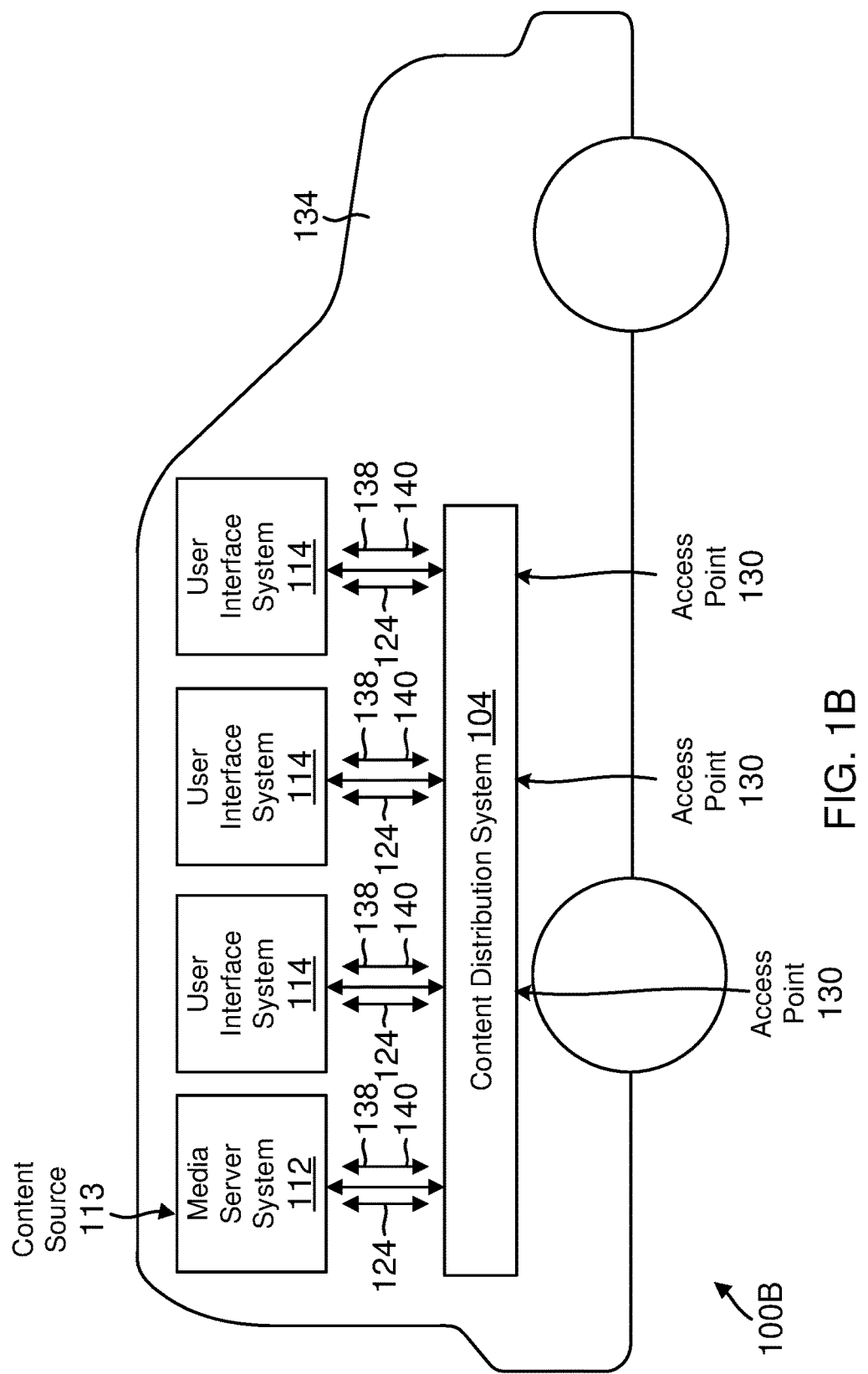
FIG. 1B shows an example of the operating environment on a non-aircraft transportation vehicle type, according to one aspect of the present disclosure.

FIG. 1B shows an example of implementing the vehicle information system 100B (may be referred to as system 100B) on an automobile 134 that may include a bus, a recreational vehicle, a boat, and/or a train, or any other type of passenger vehicle without limitation. The various components of system 100B may be similar to the components of system 100A described above with respect to FIG. 1A and for brevity are not described again.

Figure 2:
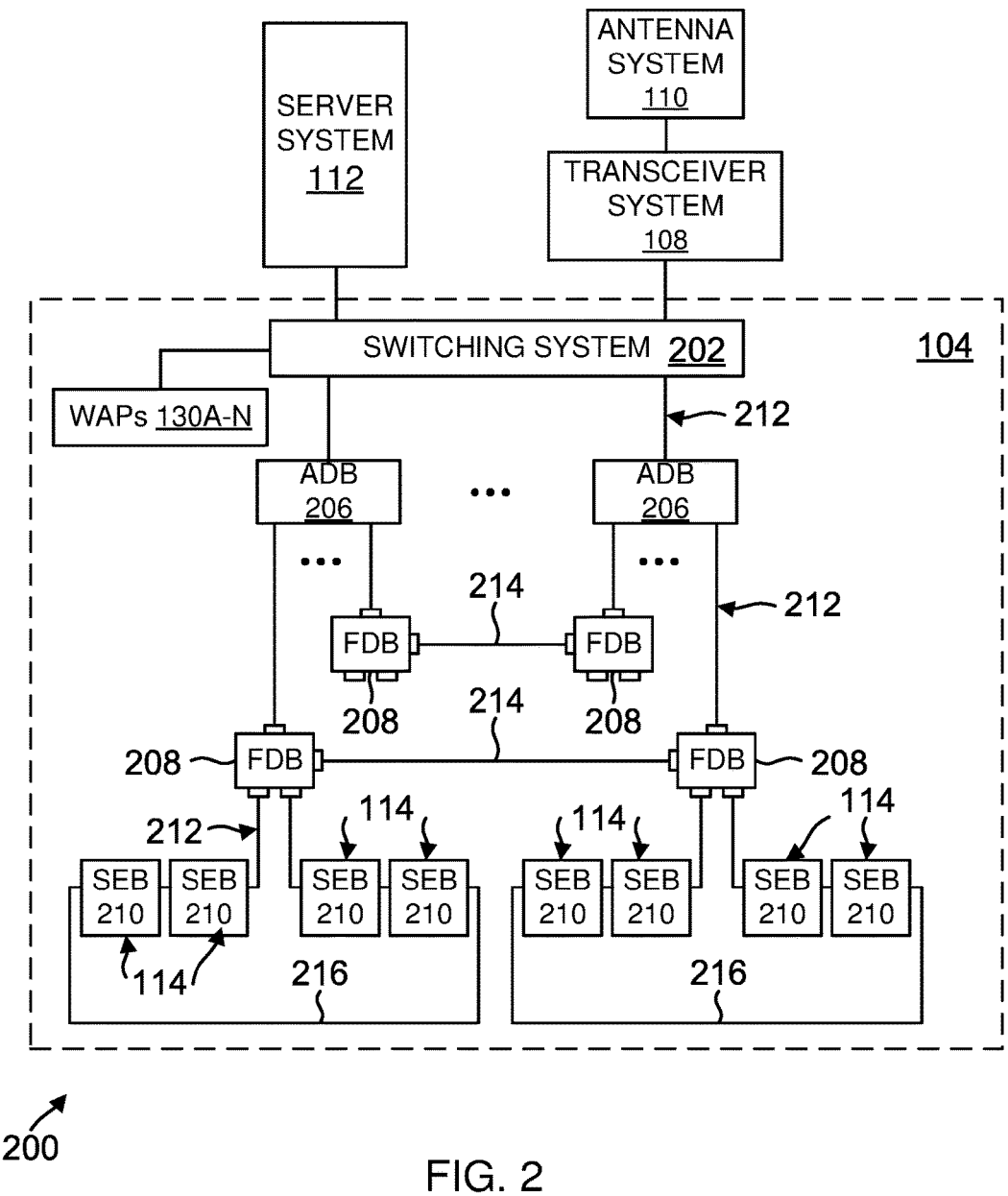
FIG. 2 shows an example of a content distribution system, used according to one aspect of the present disclosure.

Content Distribution System:

FIG. 2 illustrates an example of the content distribution system 104 for the vehicle information system 200 (similar to 100A/100B), according to one aspect of the present disclosure. The content distribution system 104 couples, and supports communication between the server system 112, and the plurality of user interface systems 114.

The content distribution system 104, for example, can be provided as a conventional wired and/or wireless communication network, including a telephone network, a local area network (LAN), a wide area network (WAN), a campus area network (CAN), personal area network (PAN) and/or a wireless local area network (WLAN) of any kind. Exemplary wireless local area networks include wireless fidelity (Wi-Fi) networks in accordance with Institute of Electrical and Electronics Engineers (IEEE) Standard 802.11 and/or wireless metropolitan-area networks (MANs), which also are known as WiMax Wireless Broadband, in accordance with IEEE Standard 802.16. Preferably being configured to support high data transfer rates, the content distribution system 104 may comprise a high-speed Ethernet network, such as any type of Fast Ethernet (such as 100 Base-X and/or 100 Base-T) communication network and/or Gigabit (such as 1000 Base-X and/or 1000 Base-T) Ethernet communication network, with a typical data transfer rate of at least approximately one hundred megabits per second (100 Mbps) or any other transfer rate. To achieve high data transfer rates in a wireless communications environment, free-space optics (or laser) technology, millimeter wave (or microwave) technology, and/or Ultra-Wideband (UWB) technology can be utilized to support communications among the various system resources, as desired.

As illustrated in FIG. 2, the distribution system 104 can be provided as a plurality of area distribution boxes (ADBs) 206, a plurality of floor disconnect boxes (FDBs) 208, and a plurality of seat electronics boxes (SEBs) (and/or video seat electronics boxes (VSEBs) and/or premium seat electronics boxes (PSEBs)) 210 being configured to communicate in real time via a plurality of wired and/or wireless communication connections 212. The distribution system 104 likewise can include a switching system 202 for providing an interface between the distribution system 104 and the server system 112. The switching system 202 can comprise a conventional switching system, such as an Ethernet switching system, and is configured to couple the server system 112 with the area distribution boxes 206. Each of the area distribution boxes 206 is coupled with, and communicates with, the switching system 202. In addition, the distribution system 104 includes one or more wireless access points (WAPs) (130A to 130N) connected in communication with the switch system 202 for wireless distribution of content to user interface systems 114 including PEDs.

Each of the area distribution boxes 202, in turn, is coupled with, and communicates with, at least one floor disconnect box 208. Although the area distribution boxes 206 and the associated floor disconnect boxes 208 can be coupled in any conventional configuration, the associated floor disconnect boxes 208 preferably are disposed in a star network topology about a central area distribution box 206 as illustrated in FIG. 2. Each floor disconnect box 208 is coupled with, and services, a plurality of daisy-chains of seat electronics boxes 210. The seat electronics boxes 210, in turn, are configured to communicate with the user interface systems 114. Each seat electronics box 210 can support one or more of the user interface systems 114.

The switching systems 202, the area distribution boxes 206, the floor disconnect boxes 208, the seat electronics boxes (and/or video seat electronics boxes (VSEBs) and/or premium seat electronics boxes (PSEBs)) 210, the antenna system 110, the transceiver system 108, the content source 113, the server system 112, and other system resources of the vehicle information system preferably are provided as line replaceable units (LRUs). The use of LRUs facilitate maintenance of the vehicle information system 200 because a defective LRU can simply be removed from the vehicle information system 200 and replaced with a new (or different) LRU. The defective LRU thereafter can be repaired for subsequent installation. Advantageously, the use of LRUs can promote flexibility in configuring the content distribution system 104 by permitting ready modification of the number, arrangement, and/or configuration of the system resources of the content distribution system 104. The content distribution system 104 likewise can be readily upgraded by replacing any obsolete LRUs with new LRUs.

The distribution system 104 can include at least one FDB internal port bypass connection 214 and/or at least one SEB loopback connection 216. Each FDB internal port bypass connection 214 is a communication connection 212 that permits floor disconnect boxes 208 associated with different area distribution boxes 206 to directly communicate. Each SEB loopback connection 216 is a communication connection 212 that directly couples the last seat electronics box 210 in each daisy-chain of seat electronics boxes 210 for a selected floor disconnect box 208 as shown in FIG. 2. Each SEB loopback connection 216 therefore forms a loopback path among the daisy-chained seat electronics boxes 210 coupled with the relevant floor disconnect box 208.

It is noteworthy that the various aspects of the present disclosure may be implemented without using FDB 208. When FDB 208 is not used, ADB 206 communicates directly with SEB 210 and/or server system 112 may communicate directly with SEB 210 or the seats. The various aspects of the present disclosure are not limited to any specific network configuration.

Figure 3:
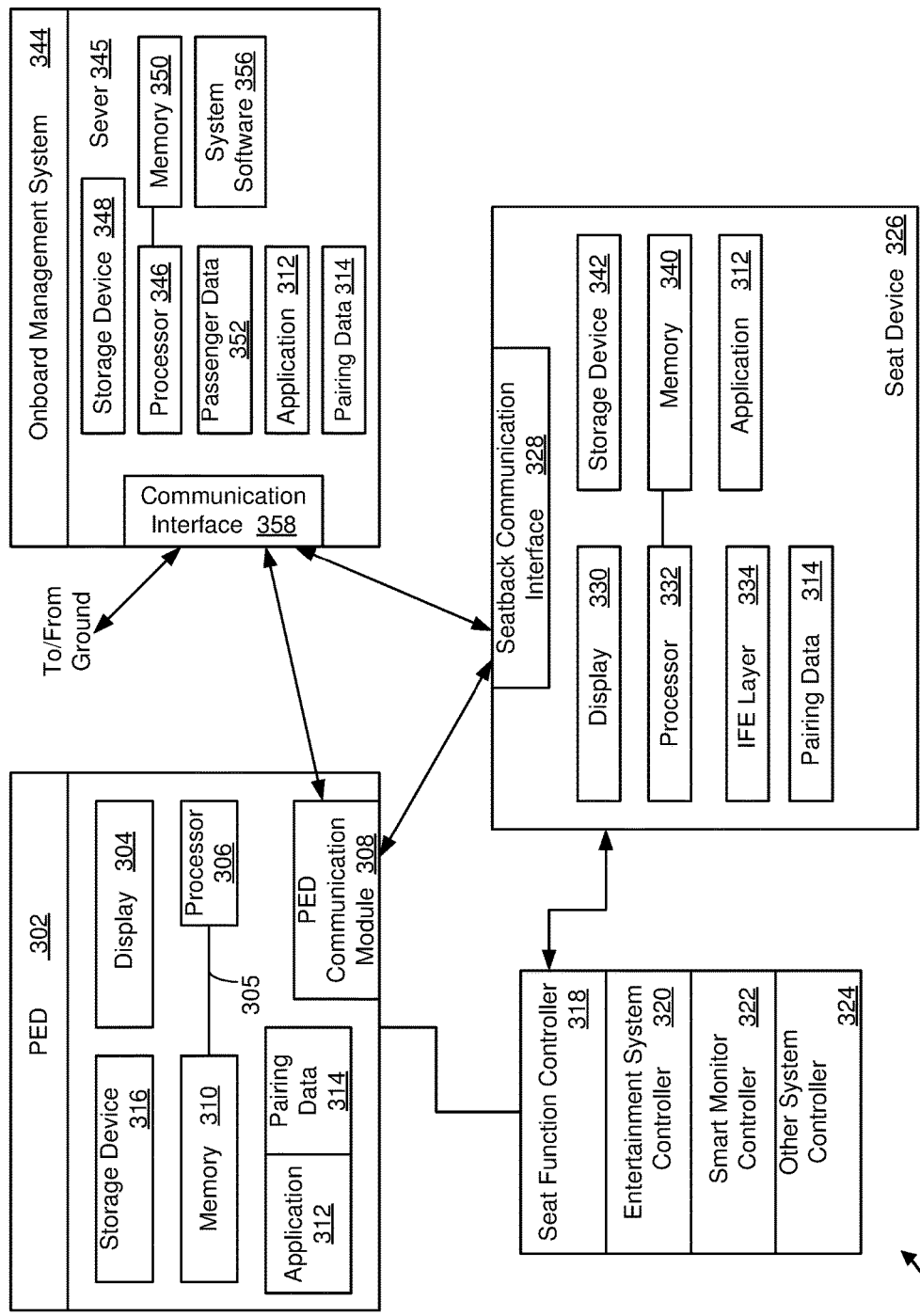
FIG. 3 shows an example of a system for a transportation vehicle, according to one aspect of the present disclosure.

System 300:

FIG. 3 shows an example of a system 300 that can use a VR handset, according to one aspect of the present disclosure. System 100 shows a seat device 326 with a seat function controller 318 for managing various seat functions. A PED 302 may be paired with the seat device 326 that also communicates with an onboard management system 344.

The onboard management system 344 may be similar to computer system 106 and/or server 112 described above with respect to FIGS. 1A/1B. The seat device 326 may be part of the user interface system 114 or interfaces with the user interface system 114 described above with respect to FIGS. 1A/1B. It is noteworthy that the seat device 326 need not be mounted on the back of a seat and may be supported from other structures, such as a bulkhead, wall, arm of a seat, etc. The adaptive aspects of the present disclosure are not limited to any specific location or orientation of the seat device 326.

In one aspect, the PED 302 may be a mobile phone, a notebook, a tablet, a laptop or any other similar device. PED 302 may include a processor 306 that has access to a memory 310 via an interconnect/bus 305 for executing stored instructions. Processor 302 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. The bus system 305 is an abstraction that represents any one or more separate physical buses and/or point-to-point connections, connected by appropriate bridges, adapters and/or controllers. The bus system 305, therefore, may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The PED 302 includes a storage device 316 that may be, or may include any storage medium for storing data in a non-volatile manner, such as one or more magnetic or optical based disks, flash memory, or solid-state drive. The storage device 316 may be used to store content that may be displayed on a display 304 of PED 302. In one aspect, display 304 may include a touch screen for receiving input commands.

The storage device 316 may also store an application (may be referred to as companion application) 312 and executed out of memory 310. In one aspect, application 312 may be stored on a non-transitory storage medium, such as a hard drive, CD, CD-ROM, DVD, flash memory, or any other storage device (volatile or non-volatile), etc. For example, application 312 may be stored on a storage device of an application store ("App Store") (not shown) such as that operated by Apple, Inc. under the trademark ITUNES, the application store operated by Google, Inc. under the trademark GOOGLE PLAY, or the application store operated by Microsoft Corporation under the trademark WINDOWS STORE. Alternatively, the app store may be a website server for a website operated by a provider of the on-board management system 344 such as the manufacturer or a carrier operating the vehicle (e.g., a commercial airline, train operator, cruise line, bus line, etc.).

The term "pair", and other grammatical forms such as "pairing", means that the PED 302 is associated with a particular passenger seat such that communications received by seat device 326 from the PED 302 are recognized as being related to that passenger seat and/or such communications control seat functions associated with the particular passenger seat and controlled by a seat function controller 318.

In one aspect, the seat function controller 318 provides a controller 320 to control the entertainment system for accessing audio/video content, a controller 322 for controlling a smart monitor (that is part of or interfaces with the seat device 326) or a VR goggle described below. Other system controller 324 may include a controller for controlling the lighting system for controlling lights for a passenger seat, e.g., a reading light, a controller for an attendant call system to call an attendant, a controller for a telephone system, a controller for food service to order food, a controller for making seat adjustments and others. The various aspects disclosed herein are not limited to any particular type of seat function.

In one aspect, the seat function controller 318 communicates with the PED communication module 308 that includes one or more interfaces to communicate with different devices, including a Wi-Fi interface, Bluetooth interface, NFC (Near Field Communication) interface and others. The adaptive aspects described herein are not limited to any specific interface. It is noteworthy that although a single block is shown for the PED communication module 308 for convenience, the communication module 308 may have different interface, cards, logic and circuitry to comply with the different communication protocols/standards.

In one aspect, the seat device 326 includes a display device or simply "display" 330, a processor 332, a memory 340, a communication interface 328 and a local storage device 342 for storing content. The seat device 326 receives user input/requests via an input module (not shown). The input module may be configured to use a local touch screen at display 330, a local virtual keyboard, an external mouse, external keyboard or any other input device. The various adaptive aspects described herein are not limited to any specific input device.

Processor 332 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

In one aspect, processor 336 executes an IFE layer 334 that provides inflight entertainment and other options to users. The IFE layer 334 uses the communication interface 328 to interface with the PED 302 and/or onboard management system 344. The IFE layer 334 provides audio/video content as well as controls for accessing the content.

In one aspect, the onboard management system 344 includes a server 345 (similar to media server 112 and/or computer system 106). The server 345 includes a processor 346 that has access to a memory 350 via a bus system, similar to bus 305 described above in detail. Processor 346 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Processor 346 has access to a storage device 348 that may be used to store data, applications and program files. In one aspect, the onboard management system 344 maintains passenger data 352 (may also be referred to as passenger manifest data 352) that identifies each passenger for a flight, a seat assigned to a passenger and any other information that can uniquely identify the passenger. The passenger data 352 may be populated from an electronic boarding pass that is used by a passenger and/or from the carrier operating the aircraft. The information from passenger data 352 may be provided to seat device 326 for validating passenger information.

System software 356 of the onboard management system 344 is executed by the processor 346 to control the overall operation of the server 345.

In one aspect, server 345 communicates with PED 302 and/or seat device 326 via a communication interface 358. The communication interface 358 may also be used to receive information from the ground. The communication interface 358 includes one or more interfaces for a wired and/or wireless connection, as described above with respect to FIGS. 1A/1B and 2.

Figure 4:
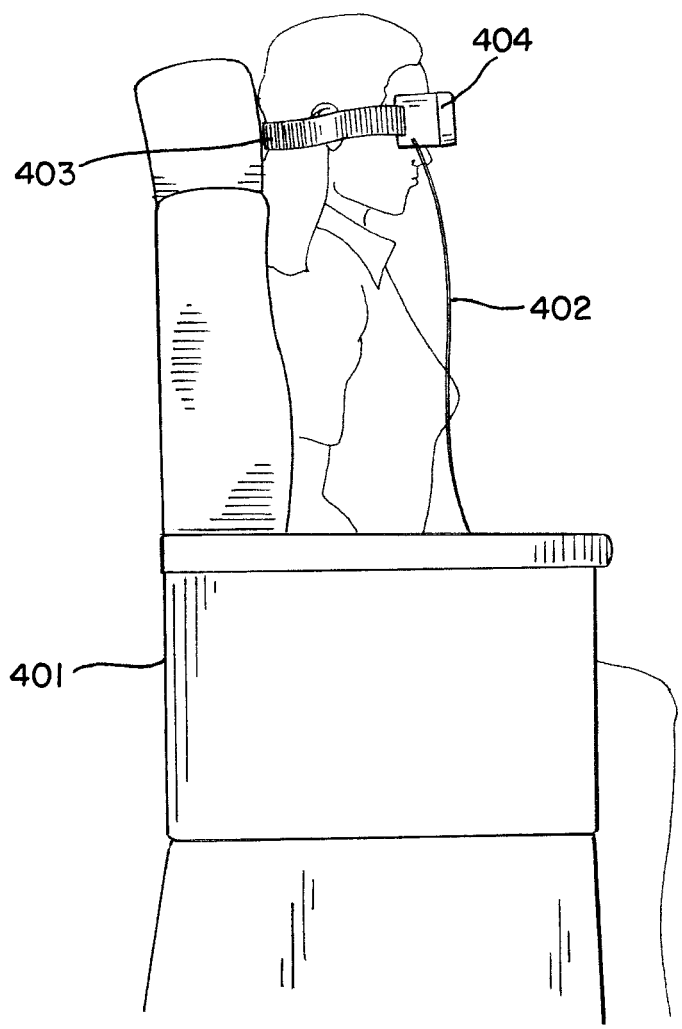
FIG. 4 shows a system diagram using a VR handset, according to one aspect of the present disclosure.

VR Handset:

FIG. 4 shows an example of a system 400 with an IFE handset 404 that is integrated or combined with VR goggles, according to one aspect of the present disclosure. The handset 404 may be referred to as VR handset 404 or VR goggles 404, interchangeably, throughout this specification.

In one aspect, VR handset 404 incorporates the functions of seat function controller 318 that is described above with respect to FIG. 3 and also supports VR goggle functionality for VR display. In another aspect, where an aircraft may not have a seat device 326 with a display, the VR goggles may operate as a display for viewing IFE content and VR content. In yet another aspect, the VR handset 404 may be paired with the PED 302 that may provide the VR content.

In one aspect, VR handset 404 uses a strap 403 enabling the handset to be used as VR goggles. It is noteworthy that the VR handset 404 is not integrated with a seat headrest, hence a passenger is able to enjoy a VR experience without having to sit in any specific position. Moreover, for hygienic reasons, the strap 403 is replaceable between. In particular, between trips the strap 403 may be removed and replaced. Used straps 403 may be discarded or sanitized and reused. Optionally, the portion of the VR handset 404 that comes into contact with a person's skin when worn as goggles, may be covered by a disposable cover or liner.

In one aspect, VR handset 404 is operationally coupled to a passenger seat 401 via a cord 402. Because the VR handset 404 is coupled to the seat 401, it reduces the chances of the VR handset 401 from being lost or removed from the vehicle without limiting passenger range of motion. Logistically, it makes it easier for an airline to manage the VR handsets on the plane because the airline crew does not have to handout individual separate VR googles to the passengers for every flight.

Figure 5:
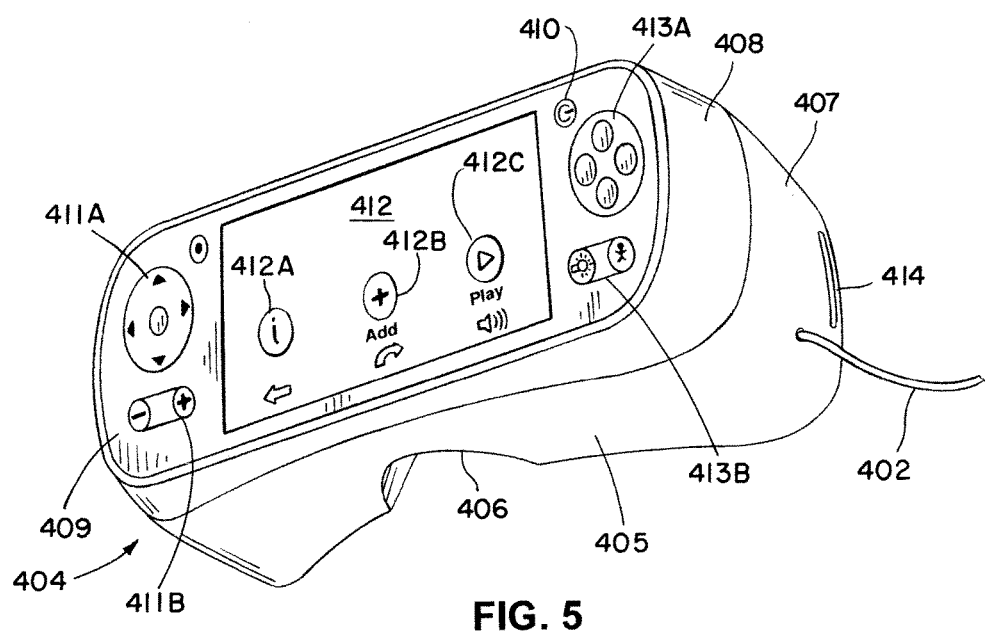
FIG. 5 shows a three-dimensional view of the VR handset of FIG. 4, according to one aspect of the present disclosure.

FIG. 5 shows a detailed three-dimensional view of the VR handset 404 with the cord 402 that is used to secure the VR handset 404 to an aircraft seat, according to one aspect of the present disclosure. Cord 402 supplies at least power for the VR handset 404 via internal conductors therein, and preferably also communicates data to and from the VR handset 404. Supplying power obviates the need for a battery or batteries to power the VR handset. Optionally, the cord 402 may supply only power if the vehicle includes a wireless access point (WAP) and the VR handset is configured to receive and transmit data wirelessly to and from the WAP. Preferably, though, the cord 402 supplies both power and data, to reduce electromagnetic transmissions in the vehicle and possible EMI interference. Cord 402 is located on the side 407 that includes an opening, for example, a slot/aperture 414 for the strap 403.

Figure 6:
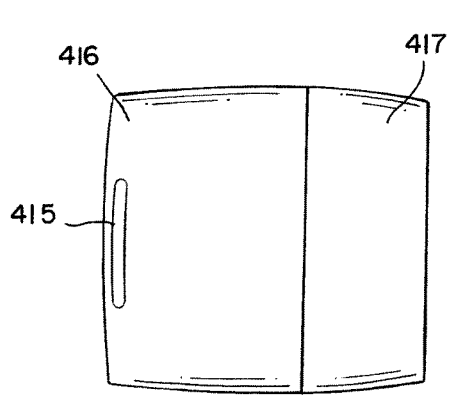
FIG. 6 is a left-hand side view of the VR handset of FIG. 5.

VR handset 404 includes a top surface 409, right hand side surfaces 407 and 408 and a front surface 405. FIG. 6 described below shows a left-hand side view with side surface 417 that is similar to 408 and 416 that is similar to 407. A curved structure/opening 406 at the front surface 405 of the VR handset 404 is used to place the VR handset on a passenger to operate as VR goggles.

The top surface 409 of the VR handset 404 includes a power button 410 to power the VR handset 404. Various controls/buttons 411-413 are provided for managing different functions, including a VR display, seat functions and others. In one aspect, for example, control/button 411A may be for managing content display, manipulating a cursor, scrolling, making selections, and etc. Control/button 411B may be for adding or removing content, controlling brightness, volume, zoom, or other settings. In panel 412, control 412A may be used to ask a question or obtain information or instructions, while 412B may be to add content to a playlist, while control 412C is used to play content. A game control 413A enables a user to play a game, while control 413B may be used to control/adjust a light or call a flight attendant. The example of FIG. 5 is intended to simply illustrate that the VR handset 404 can be used to control different functions while also operating as VR goggles without limiting the adaptive aspects of the present disclosure to any specific control set. Moreover, control buttons may be remapped.

Figure 7:
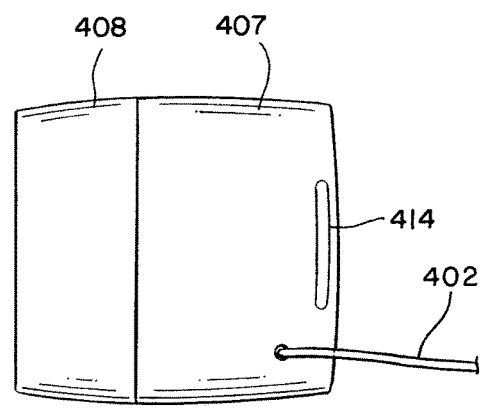
FIG. 7 is a right-hand side view of the VR handset of FIG. 5.

FIG. 6 shows a left-hand side view of the handset 404 with an aperture 415 for the strap 403 and surfaces 416 and 417 that are similar to 408 and 407 described above. FIG. 7 shows a right-hand side view with the aperture 414 and surface 408/407.

FIG. 8 shows a plan view of VR handset 404, while FIG. 9 shows a front view with the opening 406.

Figure 10:
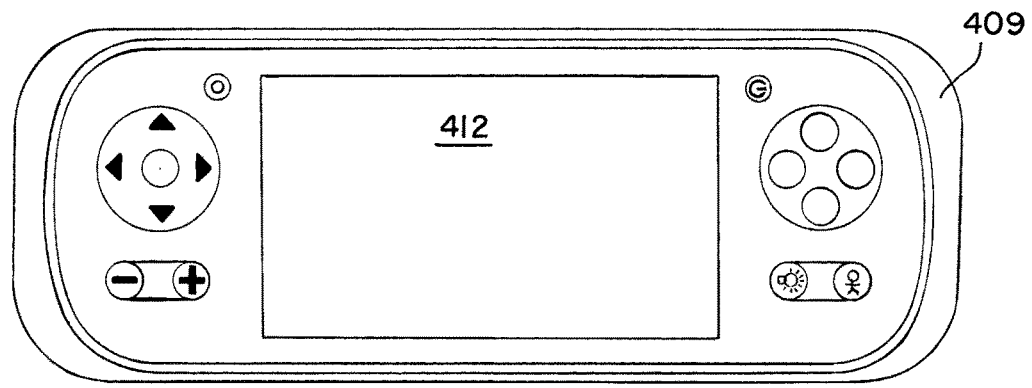
FIG. 10 is a top view of the VR handset of FIG. 5.

FIG. 10 shows a top view with surface 409 and the various controls that have been described above with respect to FIG. 5.

Figure 11:
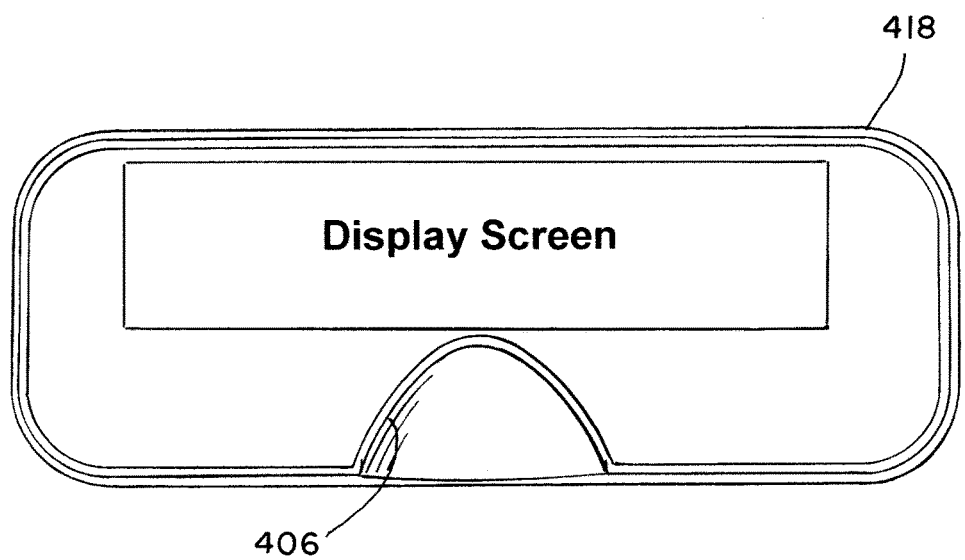
FIG. 11 is a back view of the VR handset of FIG. 5.

FIG. 11 shows the back-view of VR handset 404 with a display screen 418, according to one aspect. The display screen 418 on the inside of the handset may be used to display VR content, while the outside surface 409 has the controls for controlling the display including volume, brightness and other parameters. Display 418 may also be used to view IFE content, for example, where there is no seat device display.

FIG. 12 shows another example of a VR handset 450, according to one aspect of the present disclosure. In this aspect, the display screen and the controls are on the same side/surface, thus, VR handset 450 may be less costly than VR handset 404 because the display and controls are integrated on one side. VR handset 450 has a top surface 451, right hand side surface 452 with an aperture 453. Cord 454 is similar to 402, described above. Front surface 456 includes the curved opening 455, similar to 406 described above.

FIG. 13 is the left-hand side view of VR handset 450 with surface 457 and aperture 459, while FIG. 14 shows a right-hand side view with surface 452 and aperture 453. Apertures 453 and 459 may be used for a strap for the handset, as described above.

Figure 15:
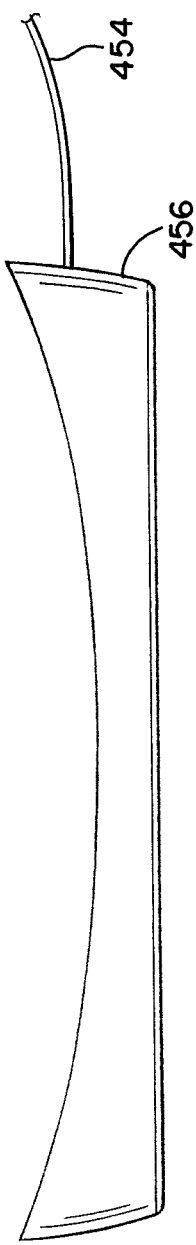
FIG. 15 is a plan view of the VR handset of FIG. 12.
Figure 16:
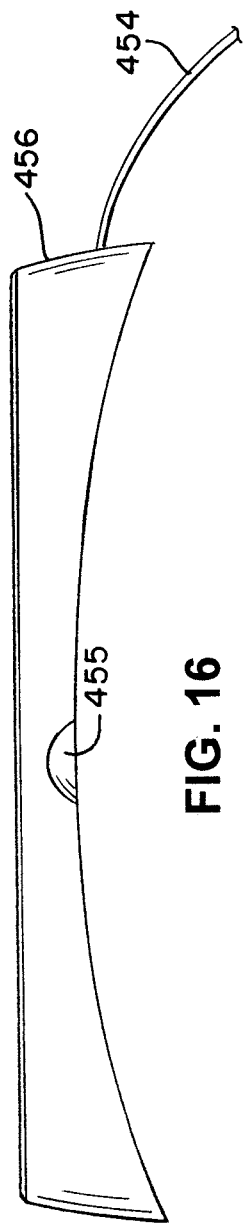
FIG. 16 is a front view of the VR handset of FIG. 12.
Figure 17:
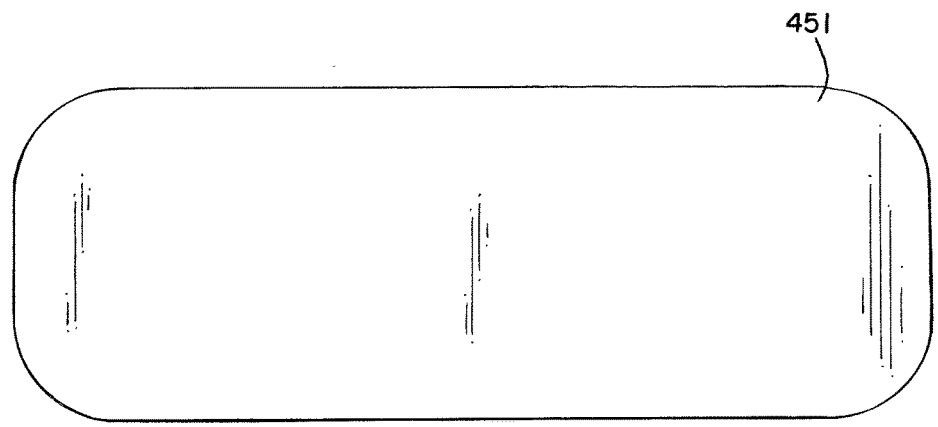
FIG. 17 is a top view of the VR handset of FIG. 12.

FIG. 15 shows a plan view of VR handset 450 and FIG. 16 shows a front view with front surface 456 and opening 455 that is used to operate the handset as a goggle. FIG. 17 shows a top view of VR handset 450 with the top surface 451.

Figure 18:
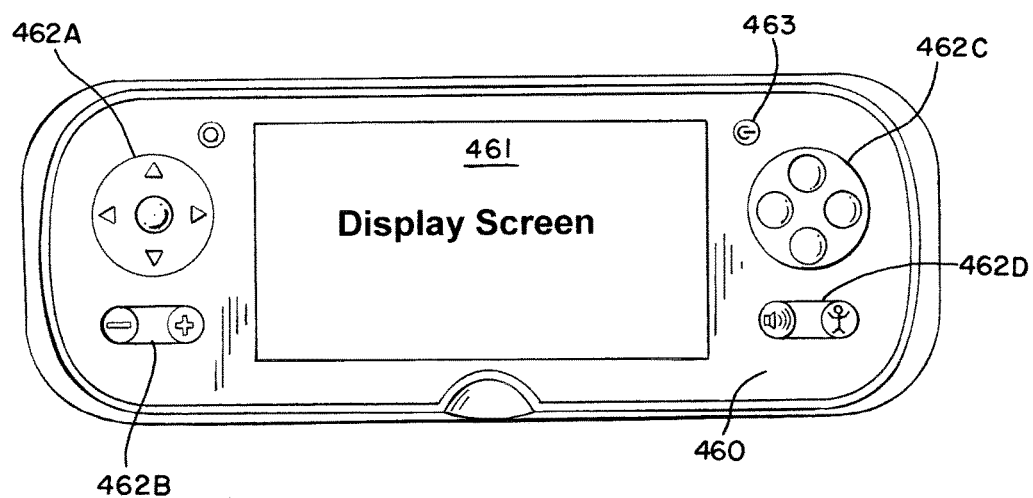
FIG. 18 is a back view of the VR handset of FIG. 12.

FIG. 18 shows a backside view (i.e., inside view when the VR handset 450 is worn by a passenger), according to one aspect of the present disclosure. A display screen 461, similar to display 412 of VR handset 404 is provided to display VR content. Controls 462A, 462B, 462C and 462D are used for controlling VR content display as well as seat functions. The handset can be powered by button 463 for activating and deactivating the device.

As described above, VR handset 450 includes both the display and controls on the same surface/screen, which reduces the overall cost of the handset.

Conventional VR goggles are integrated with a headrest of a chair. To use the VR goggles, the passenger has to sit upright in the seat, which may be uncomfortable for the passenger based on the passenger's height, weight and other constraints. The adaptive handset/goggles of the present disclosure overcomes the shortcomings by providing VR goggles integrated or combined with an IFE handset that is attached to a seat using a cord, which provides at least power for operation of the VR goggles. Advantageously, the cord enables the passenger to have more degree of freedom compared to conventional VR goggles, and prevents the goggles from being misplaced. The cord may be retractable onto a reel so that the cord is out of the way when the device is not being used, yet extensible or extendable to accommodate passenger preference, e.g., passengers of different heights or passengers that prefer to use VR goggles in a reclined seat position, etc.

In one aspect, a handset with VR goggles for an entertainment system of a transportation vehicle is provided. The handset is coupled to a seat using an extensible cord and includes a first segment having options for controlling a passenger seat function (for example, on surface 409) and a second segment with a display screen (for example, 418) for displaying VR content, when the handset operates as the VR goggles.

In another aspect, a handset with VR goggles for an entertainment system of a transportation vehicle is provided. The handset is coupled to a seat using an extensible cord. The handset includes a display screen (for example, 461) for displaying VR content, when the handset operates as the VR goggles and provides options for controlling a passenger seat function (for example, 462A-462D).

In yet another aspect, a handset for an in-flight entertainment system of an aircraft is provided. The handset includes a first segment having options for controlling a passenger seat function on the aircraft; and a second segment with a display screen for displaying VR content, when the handset operates as VR goggles.

Figure 19:
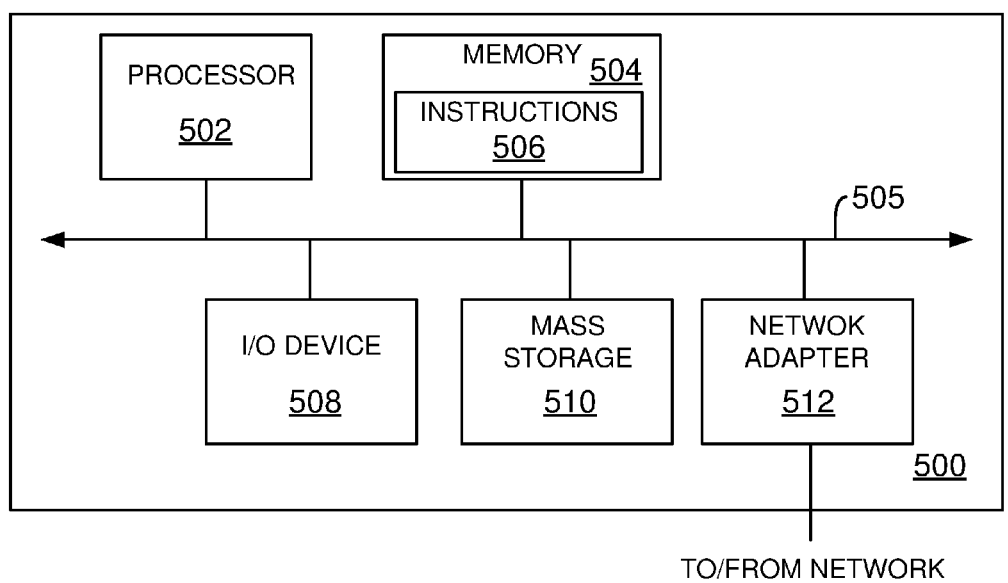
FIG. 19 shows a block diagram of a processing system, used according to one aspect of the present disclosure.

Processing System 500:

FIG. 19 is a high-level block diagram showing an example of the architecture of a processing system 500 that may be used according to one aspect. The processing system 500 can represent media server 112, computing system 106, WAP 130, onboard management system 344, seat device 326 or any user device (PED 302) that attempts to interface with a vehicle computing device as well as the VR handset 404/450. Note that certain standard and well-known components which are not germane to the present aspects are not shown in FIG. 5.

The processing system 500 includes one or more processor(s) 502 and memory 504, coupled to a bus system 505. The bus system 505 shown in FIG. 19 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 may be used to implement the seat function controls for a VR handset, while the handset also operates as VR goggles, described above.

Also connected to the processors 502 through the bus system 505 are one or more internal storage devices 510, and a network adapter 512. Internal storage devices 510 may be, or may include any conventional medium for storing large volumes of data in a non-volatile manner, such as one or more solid-state drive, magnetic or optical based disks, flash memory, or.

The network interface 512 provides the processing system 500 with the ability to communicate with remote devices e.g., over a network and may be, for example, an Ethernet adapter or the like.

The processing system 500 also includes one or more input/output (I/O) devices 508 coupled to the bus system 505. The I/O devices 508 may include, for example, a display device, a keyboard, a mouse, etc. The I/O device may be in the form of a handset having one or more of the foregoing components, such as a display with a real or virtual keyboard, buttons, and/or other touch-sensitive surfaces.

Thus, methods and systems for a VR handset have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A system, comprising:

a handset for an entertainment system of a transportation vehicle, the handset having virtual reality (VR) goggles coupled to a seat using a cord for enabling a user to place the handset for use in a user desired position, without the handset being integrated to a seat headrest of the seat; wherein the cord supplies power to the handset and is also used for transmitting data to and from the handset;

wherein the handset includes a first segment having options for controlling a passenger seat function including at least one of interfacing with a transportation vehicle crew member and controlling a display provided by the entertainment system and a second segment with a display screen for displaying VR content, when the handset operates as the VR goggles;

wherein the display screen of the handset also displays content provided by the entertainment system in addition to the VR content, when the transportation vehicle does not include a seat display device; and wherein the handset includes an inside supporting the display screen in a position facing towards the eyes of the user when the handset is worn as VR goggles, and an outside surface supporting the first segment in which the first segment comprises a display panel facing in a direction opposite from that of the display screen.

2. The system of claim 1, wherein the transportation vehicle is an aircraft, and the entertainment system is an inflight entertainment system, and the cord is extensible and supplies at least one of power and data for the VR goggles.

3. The system of claim 2, wherein the display screen displays in-flight entertainment content when not operating as VR goggles.

4. The system of claim 2, wherein the VR content is provided by a personal electronic device.

5. The system of claim 2, wherein the VR content is provided by a seat device.

6. The system of claim 2, wherein the VR content is downloaded to the aircraft using a network connection.

7. The system of claim 2, wherein the VR content is provided by one or more of a personal electronic device, a seat device and downloaded to the aircraft using a network connection.

8. The system of claim 1, wherein the handset uses a strap for enabling the user to wear the handset as the VR goggles, and wherein the cord only supplies power to the handset when the transportation vehicle includes a wireless access point.

9. The system of claim 1, wherein the transportation vehicle is one of a train, a bus, a ship and a recreation vehicle.

10. A system, comprising:

a handset for an entertainment system of a transportation vehicle, the handset having virtual reality (VR) goggles coupled to a seat using a cord for enabling a user to place the handset for use in a user desired position, without the handset being integrated to a seat headrest of the seat; wherein the cord supplies power to the handset and is also used for transmitting data to and from the handset;

wherein the handset includes a display screen for displaying VR content, when the handset operates as the VR goggles and provides options for controlling a passenger seat function including at least one of interfacing with a transportation vehicle crew member and controlling a display provided by the entertainment system;

wherein the display screen of the handset also displays content provided by the entertainment system in addition to the VR content, when the transportation vehicle does not include a seat display device; and wherein the handset includes an inside supporting the display screen in a position facing towards the eyes of the user when the handset is worn as VR goggles, and an outside surface supporting a first segment of the handset in which the first segment comprises a display panel facing in a direction opposite from that of the display screen.

11. The system of claim 10, wherein the transportation vehicle is an aircraft, and the entertainment system is an inflight entertainment system, wherein the cord is retractable and provides at least one of power and data to the VR goggles.

12. The system of claim 11, wherein the display screen displays in-flight entertainment content when not operating as VR goggles.

13. The system of claim 11, wherein the VR content is provided by a personal electronic device.

14. The system of claim 11, wherein the VR content is provided by a seat device.

15. The system of claim 11, wherein the VR content is downloaded to the aircraft using a network connection.

16. The system of claim 10, wherein the handset uses a strap for enabling the user to wear the handset as the VR goggles.

17. The system of claim 10, wherein the transportation vehicle is one of a train, a bus, a ship and a recreation vehicle.

18. A handset for an in-flight entertainment system of an aircraft, comprising:

a first segment having options for controlling a passenger seat function on the aircraft including at least one of interfacing with a transportation vehicle crew member and controlling a display provided by the entertainment system; and a second segment with a display screen for displaying VR content, when the handset operates as a VR goggles; wherein the handset is coupled to an aircraft seat using a cord for enabling a user to place the handset for use in a user desired position;

wherein the cord supplies power to the handset and is also used for transmitting data to and from the handset;

wherein the display screen of the handset also displays content provided by the entertainment system of the aircraft in addition to the VR content, when the aircraft does not include a seat display device; and wherein the handset includes an inside supporting the display screen in a position facing towards the eyes of the user when the handset is worn as VR goggles, and an outside surface supporting the first segment in which the first segment comprises a display panel facing in a direction opposite from that of the display screen.

19. The handset of claim 18, wherein the display screen displays in-flight entertainment content when not operating as VR goggles.

20. The system of claim 18, wherein the handset uses a strap for enabling the user to wear the handset as the VR goggles, and wherein the cord only supplies power to the handset when the transportation vehicle includes a wireless access point.

* * * * *